United States Patent [19]

Beegle

[11] 4,261,616
[45] Apr. 14, 1981

[54] APPARATUS FOR PREVENTING THE TIPPING OF DUMP VEHICLES

[76] Inventor: William I. Beegle, 611 Fourth Ave. Lakemont, Altoona, Pa. 16602

[21] Appl. No.: 970,660

[22] Filed: Dec. 18, 1978

[51] Int. Cl.³ ............................................. B60P 1/16
[52] U.S. Cl. .................................. 298/17 S; 91/392; 91/400; 180/282; 340/52 H
[58] Field of Search ............ 298/17 S, 17 SG, 22 AE, 298/22 C; 212/39 MS; 414/21, 699; 91/400, 401, 402, 450; 180/282; 340/52 H, 53

[56] References Cited

U.S. PATENT DOCUMENTS

| 2,684,254 | 7/1954 | Goss . | |
| 3,464,755 | 9/1969 | Brown | 340/53 X |
| 3,921,128 | 11/1975 | Snead | 180/282 X |
| 4,042,135 | 8/1977 | Pugh et al. | 212/39 MS X |
| 4,157,736 | 6/1979 | Carbert | 212/39 MS X |

*Primary Examiner*—Leslie J. Paperner
*Attorney, Agent, or Firm*—Parmelee, Miller, Welsh & Kratz

[57] ABSTRACT

Linkages connected to the axles of a single or twin axle dump vehicle open a control valve mounted on the vehicle frame to divert hydraulic fluid from the lift cylinder to the hydraulic reservoir when the frame tilts laterally a preset amount relative to the axles.

10 Claims, 6 Drawing Figures

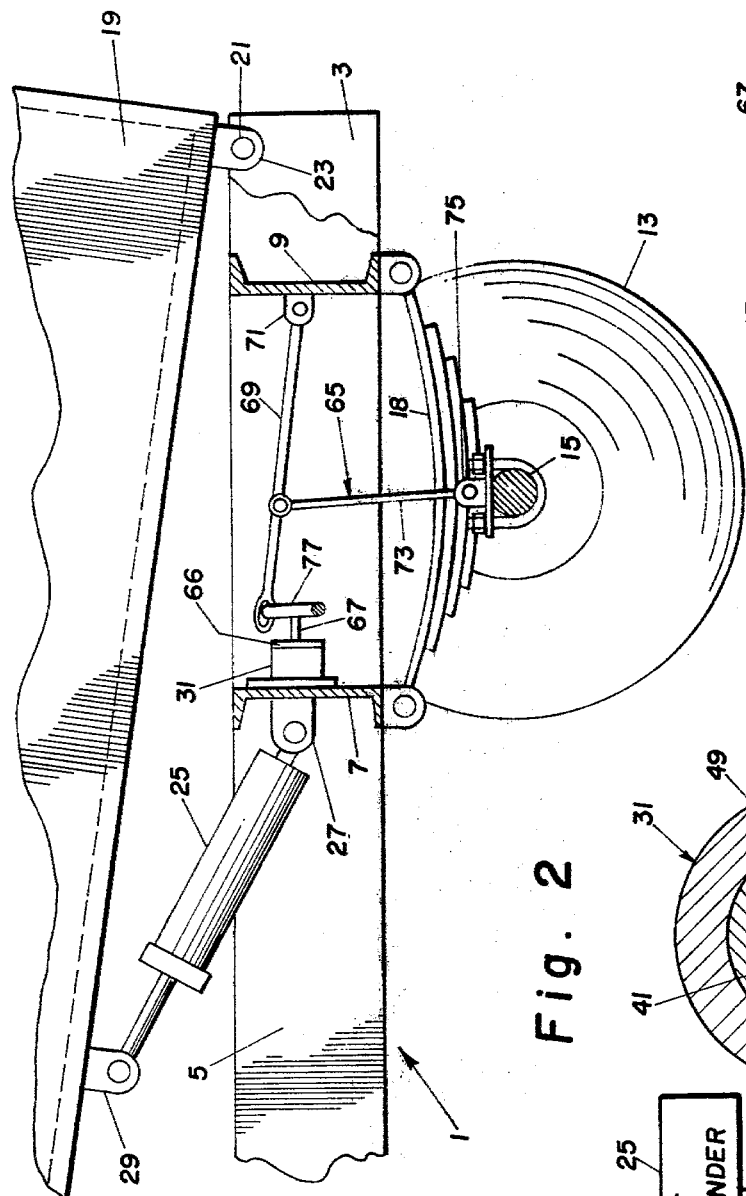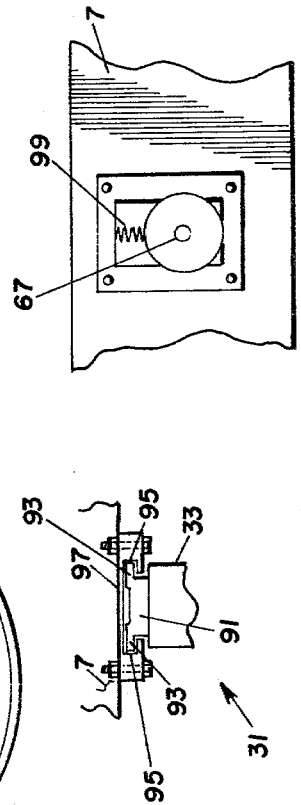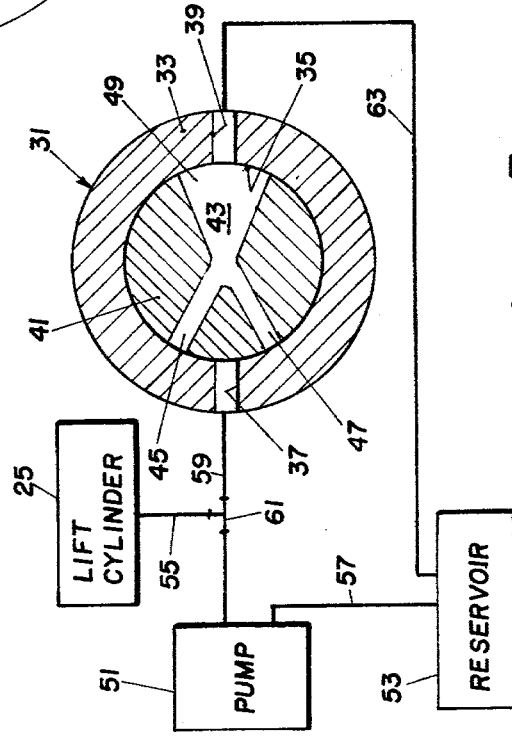

APPARATUS FOR PREVENTING THE TIPPING OF DUMP VEHICLES

BACKGROUND OF THE INVENTION

1. Field of the Invention

This invention relates to apparatus for preventing the tipping of dump trucks or trailers and particularly to apparatus which takes measures to reduce excessive tipping moments.

2. Prior Art

When operating dump trucks or trailers on uneven or unstable ground, a tipping moment can be created which tends to tip the vehicle over sideways. This tipping moment becomes larger as the bed is raised and it is all too common for it to reach the point where the vehicle is turned on its side causing serious personal injury and extensive damage to the equipment. Such a tipping moment can also be generated by a load which sticks in one side of the dump bed as it is raised.

Many approaches have been taken to alleviate this very serious problem. One common solution is to lock the truck frame to the axle as the bed is raised as exemplified by U.S. Pat. Nos. 2,999,721 and 3,512,836. A simple solution is to provide supports which contact the rear wheels for lateral stability as the bed is raised as taught by U.S. Pat. No. 3,044,832. It has also been suggested in U.S. Pat. Nos. 2,997,342 and 3,778,105 that cables or links be provided which prevent the bed from moving too far from the side of the frame. U.S. Pat. No. 3,995,894 suggests a similar arrangement using pawls and ratchets while U.S. Pat. No. 3,421,793 proposes a lateral stabilizer frame that can be swung into position to stabilize the vehicle during dumping. Another common solution among the prior art patents is to provide hydraulic leveling cylinders to adjust the bed relative to the axle which may be on an incline as, for example, shown in U.S. Pat. No. 3,640,578. On the other hand, U.S. Pat. No. 3,741,608 suggests a hydraulic valve which senses a difference in load on the two sides of the dump bed and raises the heavier side by applying hydraulic pressure to the corresponding hydraulic cylinder of a dual lift cylinder system. In an attempt to alleviate similar problems in tractors, U.S. Pat. No. 3,763,956 discloses a system which turns off the tractor engine when the front end lifts up or the tractor is tipped sideways to a critical angle. This patent also suggests automatic extension of arms to prevent lateral tipping when this critical angle is reached. U.S. Pat. No. 3,987,906 discloses a system which combines inputs indicative of the angle of a vehicle mounted jib crane and the load on the crane to terminate crane operations which would increase the tilting moment when a critical overturning moment is reached.

It is a primary object of the present invention to provide simple, reliable apparatus which prevents lateral tipping of vehicles such as dump trucks and dump trailers.

It is also an object of the invention to provide such apparatus which will reduce the tipping moment to a preset value should that moment be exceeded.

It is a further object of the invention to provide apparatus which automatically permits the bed to be raised higher as the load is dumped while still maintaining the turning moment below the critical value.

SUMMARY OF INVENTION

According to the invention the inlet of a control valve mounted on a dump vehicle frame is connected to the hydraulic line which supplies pressurized hydraulic fluid to the dump bed lift cylinder while the outlet is connected to the hydraulic reservoir. Valve actuating means are connected to the axle which is suspended from the frame by springs to open the control valve and direct hydraulic fluid from the lift cylinder to the reservoir when the frame tilts a predetermined amount relative to the axle.

With this arrangement, the bed can not be raised above a height which would generate a dangerous tipping moment. In fact, if the wheels on one side have sunk far enough in soft ground, the bed may not be permitted to be raised at all. However, where the bed is partially raised before the critical angle for the existing condition is reached, the present invention automatically permits the bed to be raised higher as the load is discharged, if this can be done without exceeding the critical tipping moment.

The control valve may have a housing with a cylindrical chamber and with the inlet and outlet openings communicating therewith at angularly spaced points in the cylindrical wall of the chamber. A cylindrical valve member rotatably mounted in the cylindrical chamber has a passage therethrough which completes a flow path from the inlet opening to the outlet opening when rotated to the valve open position. The valve actuating means may take the form of a linkage connected to the vehicle axle and the valve member which rotates the valve member to the open position when the vehicle frame tips laterally a predetermined amount with respect to the axle.

In the preferred embodiment of the invention, the passage through the valve member has two branches at one end which straddle the associated opening in the housing when the valve is in the closed position. However, when the frame tips laterally with respect to the axle the predetermined amount in either direction, the valve member rotates to bring one of the branches into alignment with the housing opening while the other end of the passage communicates with the second housing opening.

The actuating linkage may comprise a first elongated member pivotally connected at one end to the frame and at the other end to the valve such that pivoting of this elongated member opens the valve. A second elongated member is connected at one end to the axle and at the other end to an intermediate point on the first elongated member. The intermediate point is selected to provide the proper mechanical advantage such that the valve is turned on when the frame has tipped the predetermined amount with respect to the axle. When the control valve is mounted on the frame with the axis of rotation of the valve member parallel to the longitudinal axis of the vehicle, the first elongated member can be connected to the valve member by a third elongated member which rotates in a plane perpendicular to the valve member rotational axis. The third elongated member may be made of a stiff resilient material such that both ends will bend upward as the vehicle is loaded evenly but the valve member will be rotated as the dump bed tips laterally. Alternatively, the valve housing may be mounted in a vertical slide on the frame such that the entire valve is raised as the truck is loaded, but the valve will also be turned as the truck bed tips.

Preferably, the control valve is mounted in the plane of the longitudinal axis of the vehicle frame and the third elongated member extends laterally outward toward both sides of the vehicle with each end thereof connected to the axle through corresponding first and second elongated members.

The actuating linkage may be adapted for dump vehicles having a pair of axles by connecting the second elongated member to the axles through a connection at the midpoint of a fourth elongated member spanning the axles.

BRIEF DESCRIPTION OF THE DRAWINGS

FIG. 2 is a side elevation view of a section through the dump truck of FIG. 1 taken along the line II—II;

FIG. 3 is a section through a control valve in accordance with the invention and illustrating schematically the operation of the control valve in the hydraulic control system for the lift cylinder of the dump truck of FIGS. 1 and 2;

FIG. 5 is a plan view illustrating a portion of a truck frame with a control valve mounted thereon by means of an alternative mounting method; and FIG. 6 is a front elevation view of the mounting arrangement illustrated in FIG. 5.

DESCRIPTION OF THE PREFERRED EMBODIMENTS

Figure 1:
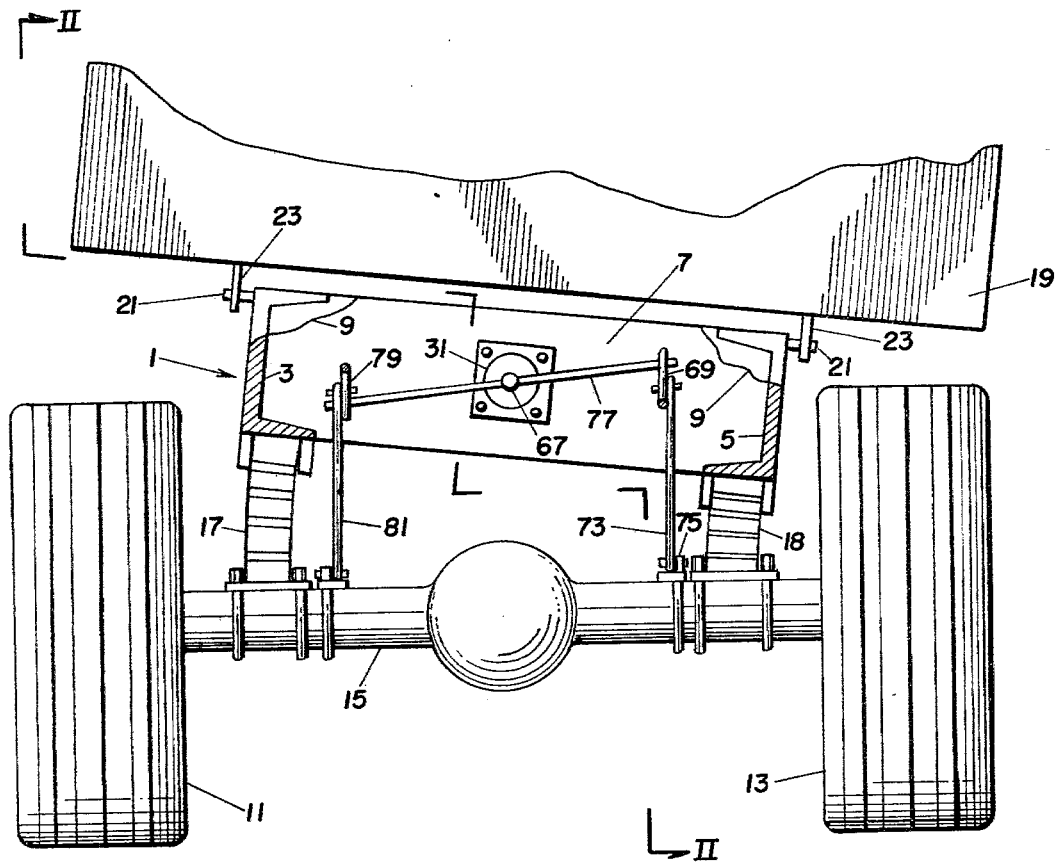
FIG. 1 is a rear elevation view with some parts cut away for clarity of a dump truck incorporating the invention.

The invention will be described as applied to the dump truck or trailer shown in FIGS. 1 and 2 having a frame 1 with longitudinal members 3 and 5 and cross members 7 and 9. Wheels 11 and 13 are mounted on the rear axle 15 which is suspended from the frame 1 by leaf springs 17 and 18 in a conventional manner. A dump bed 19 pivotally mounted to bosses 21 on the rear of the frame by dogs 23 is raised and lowered by a hydraulic cylinder 25 pivotally connected to a clevis 27 welded to the frame cross member 7 and to a clevis 29 on the truck bed.

As the dump bed is raised, its center of gravity is raised thereby increasing any tipping moment tending to turn the truck over sideways as illustrated in FIG. 1. Such a tipping moment could be created by uneven loading of the dump bed or by uneven unloading resulting from sticking or freezing of the load on one side of the bed. A tipping moment can also be created by attempting to unload the truck on uneven or unstable ground. Under the latter circumstances, raising the dump bed aggravates the tipping moment created as one wheel sinks by shifting the center of gravity of the load rearward toward the sinking wheel.

The present invention automatically prevents the dump bed 19 from being raised above an angle that would create an unsafe tipping moment. The apparatus includes a control valve 31 bolted or otherwise secured such as by welding to cross member 7 on the truck frame. As illustrated in FIG. 3, the control valve 31 comprises a housing 33 having a cylindrical chamber 35 formed therein and an inlet opening 37 and an outlet opening 39 which communicate with the chamber 35 at angularly spaced points in the cylindrical wall thereof. A valve member 41 rotatably mounted in the cylindrical chamber 35 has a radial passage 43 therethrough. One end of the passage 43 divides into two branches 45 and 47 which, with the valve in the closed position as shown in FIG. 3, straddle the housing inlet opening 37. When the valve member 41 is rotated counterclockwise from the position shown, the branch 45 will be aligned with the inlet opening 37. On the other hand, clockwise rotation of the valve member 41 brings the branch 47 into alignment with the inlet opening. The opposite end 49 of the passage 43 is flared such that it communicates with the outlet opening 39 when either of the branches 45 or 47 are aligned with the inlet. The valve member 41 is supported in the housing 33 by axial shafts, such as 67 (see FIG. 2), at either end journaled in end plates such as 66, and is sealed by circumferential "O" rings (not shown) axially disposed on each side of the radial passage 43.

The control valve 31 is inserted in the normal hydraulic system for the lift cylinder 25, which includes a pump 51 which supplies pressurized hydraulic fluid from a reservoir 53 to the lift cylinder 25 through hydraulic line 55. Under normal operation, the pump draws hydraulic fluid from the reservoir 53 through line 57 to raise the dump bed 19 and returns fluid to the reservoir through the same line to lower the bed. In accordance with the invention, the inlet 37 of control valve 31 is connected to hydraulic line 55 by line 59 and T coupling 61 and the outlet 39 is connected to the reservoir 53 through line 63. It can be appreciated from FIG. 3 that when the valve member 41 of control valve 31 is rotated either clockwise or counterclockwise to bring either branch 47 or 45 respectively into alignment, or even partial alignment, with the inlet opening 37, hydraulic fluid is diverted from the hydraulic cylinder 25 through the line 59, control valve 31, and line 63 to the reservoir 53.

Opening of the control valve 31 is controlled by valve actuating means which include a linkage 65 connected to a shaft 67 on the valve member and to the truck axle 15 (see FIG. 2). The linkage 65 comprises a first elongated member 69 pivotally mounted by a clevis 71 to the truck frame cross member 9. A second elongated member 73 is pivotally connected at one end to the first elongated member 69 and at the other end to a boss 75 clevis mounted on the axle 15. The free end of the first elongated member 69 is pivotally connected to a third elongated member 77 which is secured to the shaft 67 on the control valve 71.

Preferably, as seen in FIG. 1, the control valve 31 is mounted with the shaft 67 and therefore the axis of the valve member 41 parallel to and laterally aligned with the longitudinal axis of the truck frame 1. The third elongated member 77 extends laterally from the shaft 67 toward each side of the frame such that the left end thereof, as seen in FIG. 1, is connected to the left side of the axle 15 through pivoted first and second elongated members 79 and 81 which correspond to and are similarly arranged as elongated members 69 and 73. It can be appreciated from FIG. 1 that as the dump bed 19 and frame 1 are tipped clockwise relative to the axle 15, elongated members 69 and 73 raise the right hnd end of elongated member 77 while elongated members 79 and 81 lower the other end of member 77 an equal amount. Since the housing 33 of control valve 31 is bolted to the frame 1 and is rotated therewith, the elongated member 77 rotates the valve member 41 within the housing. If the relative movement between the housing and the valves member is sufficient, branch 45 of the passage 43 in valve member 41 will communicate with inlet 37 and hydraulic fluid will be diverted by the valve 31 from the hydraulic cylinder to the reservoir, thus lowering the dump bed to an angle which reduces tipping to the preset acceptable level. It will not be possible to raise the bed again until the tipping moment is corrected since any incremental increase in the dump bed angle will increase the tipping angle and again bypass hydraulic fluid to the reservoir 53. It can be appreciated, however, that if the dump bed remains at an angle at which unloading continues, the tipping moment may be reduced and, if so, the invention will automatically permit the dump bed angle to be increased.

The present invention provides positive control of the dump angle even for small tipping angles between the frame 1 and axle 15. As seen best in FIG. 2, the leverage provided by the connection of the second elongated member 73 to an intermediate point of the pivoted first elongated member 69, mechanically multiplies the relative movement between the frame and axle as detected by elongated member 73 by an amount equal to the ratio between the length of elongated member 69 to the distance between the connection of elongated member 73 and the pivot at 71 and applies this magnified movement to the end of elongated member 77. It is clear then that the tipping angle between the frame and axle at which the control valve 31 is opened can be selected by adjusting this ratio considered in conjunction with the length of lever arm 77.

The lever arm 77 is preferably made of heavy spring steel such that as the truck bed is loaded and the frame is lowered evenly with respect to the axle, the ends of the lever arm 77 will bend upward an equal amount. The force required to turn the valve, however, is less than that required to bend lever arm 77, such that when the bed begins to tip to one side, the valve shaft 67 will be rotated.

Alternatively, as shown in FIGS. 5 and 6, the valve housing may be mounted on the truck frame cross member 7 by a slide arrangement which may include a bracket 91 having a pair of outwardly directed vertical rails 93 secured to the back of the housing 31. The rails 93 are engaged by opposed vertical grooves 95 in a fixture 97 bolted or otherwise fixed on the frame cross member 7. A spring 99 biases the valve housing downward. With this arrangement, as the truck is loaded evenly and the frame is lowered relative to the truck axle, the equal relative upward movement of the free ends of the elongated members 69 and 79 raises the valve housing 33 in the slide. However, since the housing 33 can only move vertically and can not rotate, the valve shaft 67 is rotated as the bed begins to tip.

Figure 4:
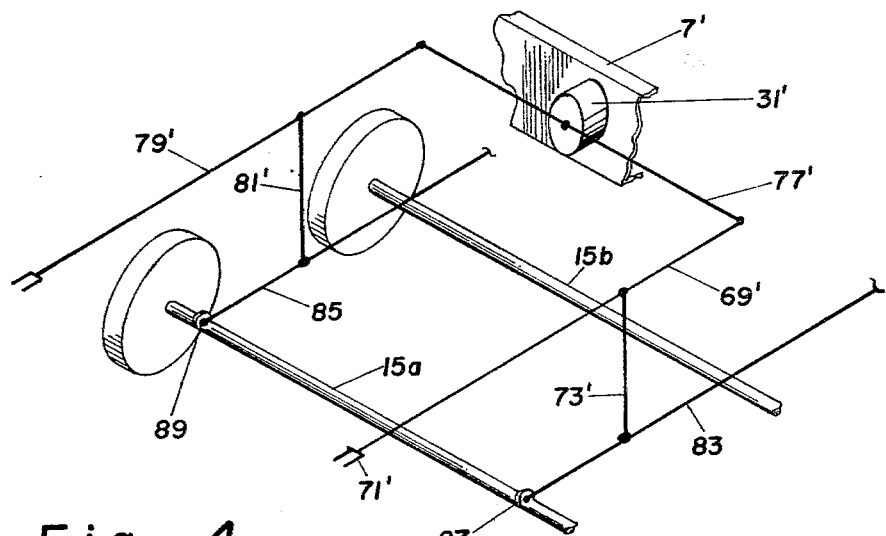
FIG. 4 is an isometric view which schematically illustrates an embodiment of the invention adapted for use with a dump vehicle having a pair of rear axles.

The present invention can also be used with dual axle dump trucks or trailers, as illustrated schematically in FIG. 4, where components comparable to those described in connection wth FIGS. 1 through 3 have been identified by like primed reference characters. In this arrangement, the second elongated members 73' and 81', rather than being connected directly to an axle, are instead pivotally connected to the midpoints of fourth elongated members 83 and 85 respectively which span the dual axles 15a and 15b and are each pivotally connected to one of these axles as at 87 and 89. The fourth elongated members 83 and 85 tend to average the height of the independently suspended axles 15a and 15b, otherwise the arrangement works exactly as described above with regard to a single axle dump vehicle.

While the presently contemplated preferred embodiments of the invention have been specifically disclosed, it will be appreciated by those skilled in the art that many modifications, all fully within the spirit of the invention, can be made in light of these teachings and therefore the invention is not to be limited thereby but it is to be given the full scope of the appended claims and all equivalents thereof.

I claim:

1. Apparatus for preventing the tipping of a dump vehicle in which the axle is suspended from the frame by springs and the dump bed which is pivoted to the frame is raised and lowered by a hydraulic cylinder supplied through a hydraulic line with pressurized hydraulic fluid from a reservoir, said apparatus comprising:

a control value mounted to the vehicle frame, said control valve having a housing with a cylindrical chamber therein with inlet and outlet openings communicating therewith at angularly spaced points in the cylindrical wall thereof and a cylindrical valve member mounted for rotation within the cylindrical chamber, said valve member having a passage therethrough which when said valve member is rotated to the open position, completes a flow path from said inlet to said outlet openings;

means connecting said valve inlet to said hydraulic line and connecting said outlet to said reservoir; and valve actuating means comprising a linkage connected to the vehicle axle and the valve member to rotate said valve member to said open position to divert hydraulic fluid from said cylinder through said valve to the reservoir when said frame tips laterally a predetermined amount with respect to said axle.

2. The apparatus of claim 1 wherein the valve member has two angularly spaced branches at one end of said passage which straddle one of said openings in the housing when the valve is in the closed position such that rotation by said actuating linkage when said frame tips laterally said predetermined amount in either direction with respect to the axle rotates the valve member to align one of said branches with the associated housing opening while the other end of said passage communicates with the other housing opening.

3. The apparatus of claim 2 wherein said linkage comprises:

a first elongated member pivotally connected to the vehicle frame at one end and to the valve member through the other end such that pivoting of said first elongated member rotates said valve member; and a second elongated member connected to the vehicle axle at one end and to an intermediate point on said first elongated member at said other end, said intermediate point being selected to provide the necessary leverage on the first elongated member to rotate said valve member to the open position when the frame has tipped laterally said predetermined amount with respect to the axle.

4. The apparatus of claim 3 wherein said control valve is mounted to the frame with the axis of rotation of said valve member parallel to the longitudinal axis of said vehicle and wherein said linkage includes a third elongated member connected to the valve member for rotation thereof and to said other end of said first elongated member for rotation thereby about the axis of the valve member.

5. The apparatus of claim 4 wherein said control valve is mounted to the vehicle frame laterally aligned with the longitudinal axis thereof, wherein said third elongated member is connected at its midpoint to the valve member with the ends thereof extending laterally outward toward the sides of the vehicle frame and wherein corresponding first elongated members are connected to each end thereof with corresponding second elongated member connected to said first elongated members and to the axle near the corresponding sides of the vehicle frame.

6. The apparatus of either claim 3, 4 or 5 adapted for use with a dump vehicle having a pair of axles suspended by springs from said frame and wherein said other end of said second elongated member is connected to said axles through a connection at the midpoint of a fourth elongated member spanning the two axles.

7. The apparatus of claim 5 wherein said third elongated member is a stiff resilient member which bends upward at each end as the truck bed is loaded evenly and which rotates the valve member as the truck bed and frame tip with respect to the truck axle.

8. The apparatus of claim 5 wherein said control valve is mounted to said frame by a slide arrangement which permits vertical movement of the control valve as the truck bed is loaded evenly.

9. The apparatus of claim 7 adapted for use with a dump vehicle having a pair of axles suspended by springs from the frame, and wherein the other end of said second elongated member is connected to the axles through a connection at the midpoint of a another elongated member spanning the two axles.

10. Apparatus for preventing the tipping of a dump vehicle in which the axle is suspended from the frame by springs and the dump bed which is pivoted to the frame is raised and lowered by a hydraulic cylinder supplied through a hydraulic line with pressurized fluid from a reservoir, said apparatus comprising:

a control valve having an inlet and outlet opening mounted to said vehicle frame;

means connecting said valve inlet to said hydraulic line and connecting said outlet to said reservoir; and valve actuating means comprising a linkage having a first elongated member pivotally connected at one end thereof to the frame and at the other end to the valve and a second elongated member connected at one end thereof to the vehicle axle and at the other end to an intermediate point on said first elongated member for opening said valve to divert hydraulic fluid from said cylinder through said valve to the reservoir when said frame tips a predetermined amount with respect to said axle.

* * * * *